Jan. 23, 1934.  E. E. ARNOLD  1,944,776
FABRICATED STEEL SPIDER
Filed Jan. 30, 1930
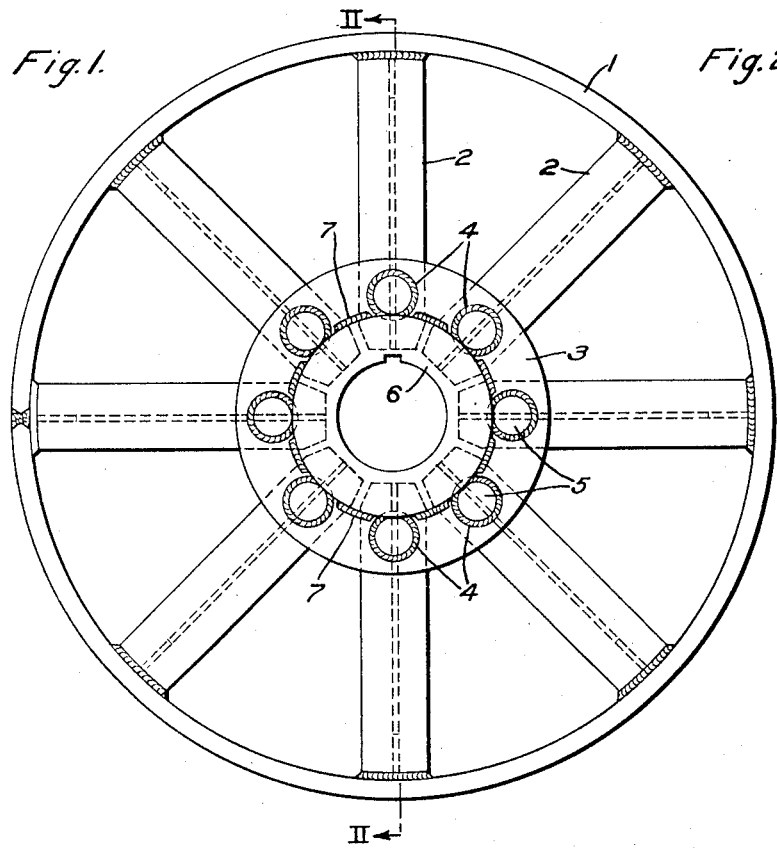
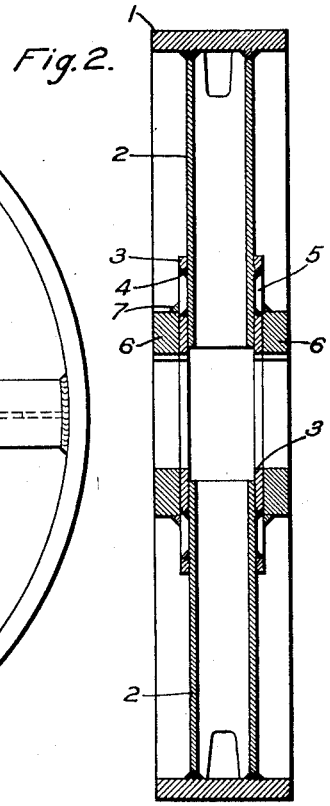
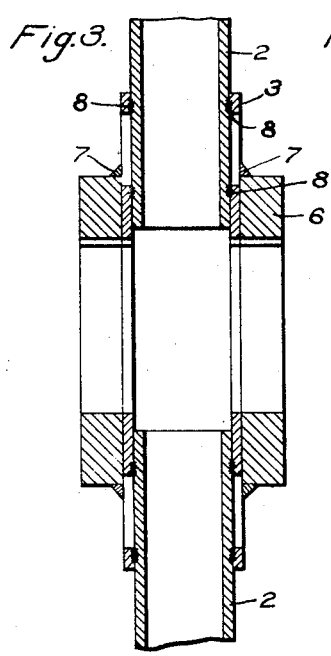
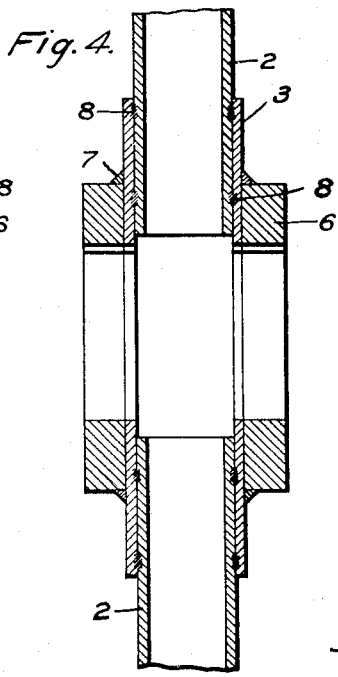
INVENTOR
*Edwin E. Arnold.*
BY
*Wesley G. Carr*
ATTORNEY Patented Jan. 23, 1934

1,944,776

UNITED STATES PATENT OFFICE 1,944,776

FABRICATED STEEL SPIDER

Edwin E. Arnold, Pittsburgh, Pa., assignor to Westinghouse Electric & Manufacturing Company, a corporation of Pennsylvania Application January 30, 1930. Serial No. 424,590

9 Claims. (Cl. 171—252)

My invention relates to fabricated steel spiders and to methods of making the same.

Prior to my invention, the rotors of dynamo-electric machines were usually made of unitary castings. For large machines, the castings were very expensive since it was necessary, in almost every case, to build individual patterns for each rotor. Also, the rotors were unduly heavy.

To reduce the cost, as well as to decrease the weight, of the rotors, it was proposed to fabricate them from rolled-steel shapes.

In order to have sufficient strength in the hub members of such fabricated spiders, it was necessary to make them of such thickness that they were practically unyielding. The unyielding hub block was welded directly to the fact of the radial spokes or arms. Then, because of the unyielding nature of the hub blocks, there was a heavy concentration of stress at the ends of the welds between the hub blocks and the arms.

In all the types of fabricated spiders with which I am familiar, the weld extends entirely across the face of the arms so that the peak of the stress-concentration is at the edges of the arms. This often results in incipient cracks which eventually result in total failure of the arms.

The effect just mentioned is much more pronounced in machines having non-uniform or pulsating power application or having non-uniform loads. In such machines, the arms act in the same manner as beams under vibrational stress. Abnormally large stresses are set up at the edges of the arm-face, thus causing incipient cracks and eventually causing total failure of the arm.

I have eliminated stress-concentration by inserting a stress plate between the spider arm and the hub to absorb or dissipate the peaks of the stresses and by developing a stress-distributing weld between the spider arms and the stress plate which evenly distributes the stresses about the welded area. The weld is removed from the edge of the arm-face in such manner that the stresses are evenly distributed through the metal of the spider arm.

It is an object of my invention to provide an improved fabricated metal spider.

It is a further object of my invention to provide an improved method of joining spider arms or spokes to a hub.

It is a further object of my invention to improve the union between spider arms or spokes and the hub.

Further objects and advantages will be apparent from the following detailed description, in conjunction with the annexed drawing, in which:

Figure 1 is an elevational view of a spider embodying my invention;

Fig. 2 is a cross sectional view of the spider of Fig. 1, showing the method of uniting the parts;

Fig. 3 is an enlarged cross-sectional detail view showing a modification, and

Fig. 4 is a similar view showing a further modification.

The apparatus disclosed in the drawing comprises a rim 1 which may be either solid, such as the rim of a fly wheel, or built up of laminations, to serve as the core of a rotor for a dynamo-electric machine. Extending radially inward from this rim are spoke-like members or spider arms 2, formed of rolled, or so-called structural, steel, preferably of H cross-section although any flanged srtuctural steel member is suitable. At the inner junctions of the spider arms or spokes, is my annular stress-plate 3 which is joined to the faces of the spokes by means of a stress-distributing weld 4 which is of annular form and of less diameter than the width of the face of the spoke.

The stress-plate 3 is preferably of slightly less thickness, or not greater thickness, than the thickness of the face of the spider arm. The stress plate is of such size that the greater portions of stress-distributing welds may be placed beyond the outer circumference of the hub blocks which will presently be described.

The annular weld 4 may be made in a variety of ways, but I prefer to make it by providing a plurality of perforations 5 in the stress-plate 3, each perforation being approximately two-thirds to three-fourths the width of the face of an adjacent spoke. The stress-plate is located with its perforations or holes 5 in register with the corresponding faces of the spokes and out of contact with their edges. The stress-plate is then arc-welded to the spokes at the peripheries of the holes. A stress-plate 3 is preferably applied on each side of the rotor member.

After the stress-plate has been connected to the spokes, a hub 6, which may be either split or solid and of any desired configuration, is applied to each of the stress-plates and welded to the same, preferably by means of arc welding 7, care being taken that the weld 7 between the hub and each stress-plate in no manner intersects, or comes into contact with, the weld 4 between the stress-plate and the spokes.

The hub block 6, being comparatively thick, in order to provide the necessary metal for keyways, is substantially rigid and unyielding. Consequently, at the points of weld between the stress-plates and the hub, the stress-plates are also held rigid. In order to prevent this rigidity from hampering the stress-distributing welds 4, the welds 7 between the hub and the stress-plates are either so placed as not to intersect the stress-distributing welds 4, or are made discontinuous at the points where it would otherwise cross or come into contact with the stress-distributing welds. In this manner, the stress-plates will be able to yield sufficiently to equalize all stress-distribution to the spider arms. Usually, a stress-plate and a hub will be placed on each side of the arms or spokes.

A modified method of connecting the stress-plate to the face of the arms or spokes consists in applying a circular electrode to the outside of the face of the plate or stress member 3 and grounding the other side of the circuit on the spoke and then applying current and pressure. A circular weld 8 between the stress plate and the spoke will result, as shown in Figs. 3 and 4. In this instance, it is unnecessary to provide the holes 5 in the stress plate, as shown in Fig. 4.

Any desired means may be employed to localize the welding current to the circular portion desired to be welded.

In operation, power is supplied to the hub block by any desired prime mover. This power, if applied by a reciprocating engine, an internal-combustion engine, or any other non-uniform source of power, will be pulsating. This pulsating power is transmitted by the hub to the stress plate and from the stress plate to the spider arms, and from there to the rim. This pulsating power causes vibratory stresses in the spider arms, causing the spider arms to tend to rotate or oscillate about the central points of the circular welds 4. This tendency to rotation causes all portions of the annular welds 4 to be equally stressed, and, consequently, these welds distribute the load evenly to all portions of the metal adjacent thereto. Since the annular welds 4 are removed from the edges of the faces of the spider arms, no stresses are distributed directly to said edges, and, consequently, there is little danger of cracks starting in said edges, the weld between the hub block and the stress-plate being of such character as to be free from, and not, in any manner, intersecting the welds between the stress-plate and the spider arms. The stress-plate is free to absorb a large portion of the vibratory stress between the hub block and the spider arms, and, in this manner, greatly reduces the stresses between the stress-plate and the spider arms.

Although I have shown and described certain specific embodiments of my invention, I am fully aware that many modifications thereof are possible. I desire, therefore, that only such limitations shall be imposed as are indicated in the appended claims.

I claim as my invention:

1. A fabricated steel spider comprising a plurality of radially disposed structural steel spokes, an annular stress-plate at the side of the spokes near the inner ends thereof, the stress-plates having holes in register with the faces of the respective spokes, said holes being of less diameter than the respective widths of the faces of the spokes, the stress-plate being integrally united to the faces of the spokes at the peripheries of the holes.

2. A fabricated steel spider comprising a plurality of radially disposed structural steel spokes, an annular stress-plate at the side of the spokes near the inner ends thereof, the stress-plates having holes registering with the faces of the respective spokes, said holes being of less diameter than the respective widths of the faces of the spokes, the stress-plate being integrally united to the faces of the spokes at the peripheries of the holes, and a hub member integrally united to the stress-plates.

3. A fabricated steel member for a dynamo-electric machine comprising a rim, structural-steel spokes attached to the rim, a stress-plate for each side of the member, the stress-plates being provided with holes opposite the respective spokes, of less diameter than the width of the respective faces of the spokes, the spokes and stress-plate being integrally united at the peripheries of the holes, and hub blocks integrally united to the stress-plates.

4. A spider comprising radial arms of rolled steel, and a stress-plate united to the arms by circular welds of less diameter than the respective widths of the faces of the arms.

5. A spider comprising radial arms of rolled steel, a stress-plate united to the arms by annular welds of less diameter than the respective widths of the faces of the arms, and a hub united to the stress-plate by welding which does not make contact with the circular welds.

6. A spider comprising radial arms having flanges, and an annular stress-plate lying against the inner ends of the flanges of the arms, the stress-plate being welded to the arm flanges by substantially annular welds of less diameter than the respective widths of the flanges.

7. A spider comprising radial arms having flanges, an annular stress-plate alongside of the inner ends of the arms, the stress-plate being welded to the arm flanges by substantially annular welds of less diameter than the respective widths of the flanges, and a hub member welded to the stress-plate at points out of contact with said circular welds.

8. A fabricated spider comprising radial arms and a stress-plate, the stress-plate being provided with holes each having a diameter approximately three fourths as large as the width of the face of the spoke in register therewith, the stress-plate being welded to the arms at the peripheries of the holes.

9. A spider assembly comprising a heavy hub-like member, an arm member extending from the hub-like member, said arm having a flat flange-like face presented toward the hub member, a relatively thin stress member interposed between said members, said stress member having a hole therein of less diameter than the width of the flange-like face, a weld securing said stress plate to said arm at the periphery of the hole, said weld being spaced from the edge of the flange face, and a line weld securing the stress plate to the hub-like member, said line weld being spaced from said first-mentioned weld.

EDWIN E. ARNOLD.